US012176658B2

(12) United States Patent
Yen

(10) Patent No.: US 12,176,658 B2
(45) Date of Patent: Dec. 24, 2024

(54) CONNECTOR

(71) Applicant: Chant Sincere Co., Ltd., New Taipei (TW)

(72) Inventor: Ming Hui Yen, New Taipei (TW)

(73) Assignee: Chant Sincere Co., Ltd., New Taipei (TW)

( * ) Notice: Subject to any disclaimer, the term of this patent is extended or adjusted under 35 U.S.C. 154(b) by 366 days.

(21) Appl. No.: 17/696,883

(22) Filed: Mar. 17, 2022

(65) Prior Publication Data

US 2022/0302653 A1 Sep. 22, 2022

(30) Foreign Application Priority Data

Mar. 17, 2021 (TW) ................................ 110202817

(51) Int. Cl.
*H01R 24/60* (2011.01)
*H01R 13/6585* (2011.01)

(52) U.S. Cl.
CPC ................................ *H01R 13/6585* (2013.01)

(58) Field of Classification Search
CPC .. H01R 13/6585; H01R 12/724; H01R 24/60; H01R 13/6594
See application file for complete search history.

(56) References Cited

U.S. PATENT DOCUMENTS 9,373,916 B2 * 6/2016 Liu ........................ H01R 12/57
9,379,494 B1 * 6/2016 Hu ......................... H01R 24/64
10,490,947 B2 * 11/2019 Huang ............... H01R 13/6585
2015/0380858 A1 * 12/2015 Kao ..................... H01R 13/658 439/620.22
2016/0141806 A1 * 5/2016 Guo ..................... H01R 13/504 29/883
2016/0149345 A1 * 5/2016 Liu ........................ H01R 12/72 439/607.01
2016/0149350 A1 * 5/2016 Kao ..................... H01R 12/724 439/607.05
2016/0197442 A1 * 7/2016 Lin .................... H01R 13/6585 439/607.05
2016/0261056 A1 * 9/2016 Jiang .................... H01R 12/724
2017/0040761 A1 * 2/2017 Tsai ..................... H01R 13/642
2017/0271821 A1 * 9/2017 Xie .................... H01R 13/6585
2022/0302653 A1 * 9/2022 Yen .................... H01R 13/6594

* cited by examiner

*Primary Examiner* — Abdullah A Riyami
*Assistant Examiner* — Nelson R. Burgos-Guntin
(74) *Attorney, Agent, or Firm* — JCIPRNET

(57) ABSTRACT

A connector including a casing, a base, a rear plug, a plurality of first terminals, a plurality of second terminals, a middle shielding, an upper shielding and a lower shielding. The base is disposed in the casing and includes an upper portion, a middle portion and a lower portion. The rear plug is disposed at a side of the lower portion. The first terminals are insert molded on the upper portion. Each of the second terminals includes a first portion and a second portion that are connected in a bent manner. The first portions are insert molded on the lower portion, and the second portions are insert molded on the rear plug. The middle shielding passes through the middle portion and is disposed between the first terminals and the second terminals. The upper shielding and the lower shielding are fixed to the base.

9 Claims, 6 Drawing Sheets

CONNECTOR

CROSS-REFERENCE TO RELATED APPLICATION

This application claims the priority benefit of Taiwan application serial no. 110202817, filed on Mar. 17, 2021. The entirety of the above-mentioned patent application is hereby incorporated by reference herein and made a part of this specification.

BACKGROUND OF THE INVENTION

1. Technical Field

The disclosure relates to a connector.

DESCRIPTION OF RELATED ART

With the advancement of technology, the size of connectors is getting smaller and smaller, and the number of terminals is also increasing with the improvement of transmission specifications. Taking one of the new connector specifications (USB C type connector) as an example, its overall size is smaller than the current USB 2.0 connector, and this type of connector has two rows of terminals on the top and bottom, and the number of terminals in each row is 12.

Most of the current connectors are provided with a positioning structure for fixing the terminals, and the positioning structure has through holes corresponding to the positions of the terminals. During the manufacturing process, the terminals are formed and inserted into the through holes respectively so as to limit the positions of the terminals, thus avoiding the terminals from being skewed and bent, which may result in short circuit or failure of smooth transmission. However, when small and large number of terminals are inserted into the through holes, it may cause the problem of low assembly yield. In addition, the existing manufacturing steps are numerous and the assembly efficiency is not high.

SUMMARY OF THE INVENTION

The disclosure provides a connector with better assembly yield.

The connector of the disclosure includes a casing, a base, a rear plug, multiple first terminals, multiple second terminals, a middle shielding, an upper shielding, and a lower shielding. The base is disposed in the casing and includes an upper portion, a middle portion, and a lower portion. The rear plug is disposed at a side of the lower portion. The first terminals are insert molded on the upper portion. Each of the second terminals includes a first portion and a second portion that are connected in a bent manner. The first portions are insert molded on the lower portion, and the second portions are insert molded on the rear plug. The middle shielding passes through the middle portion and is disposed between the first terminals and the second terminals. The upper shielding is fixed to the base and disposed at a side of the upper portion. The lower shielding is fixed to the base and disposed at a side of the lower portion.

In an embodiment of the disclosure, the upper portion has a surface away from the middle portion. The surface has at least one depression, such that the upper portion has different thicknesses.

In an embodiment of the disclosure, the upper shielding includes a first upper shielding portion and a second upper shielding portion connected to the first upper shielding portion in a bent manner, where when the connector is docked with a docking connector, the first upper shielding portion contacts the docking connector, the second upper shielding portion abuts the casing, the at least one depression includes a first upper depression, the upper portion includes an upper portion main body and an upper portion extension, the first upper depression is formed on the upper portion extension such that a thickness of the upper portion extension is smaller than a thickness of the upper portion main body, where the first upper shielding portion is disposed at the upper portion extension and disposed in the first upper depression.

In an embodiment of the disclosure, the at least one depression includes a second upper depression formed in the upper portion main body.

In an embodiment of the disclosure, the lower portion has a surface away from the middle portion. The surface has at least one depression, such that the lower portion has different thicknesses.

In an embodiment of the disclosure, the lower shielding includes a first lower shielding portion and a second lower shielding portion connected to the first lower shielding portion in a bent manner, where when the connector is docked with a docking connector, the first lower shielding portion contacts the docking connector, the second lower shielding portion abuts the casing, the at least one depression includes a first lower depression, the lower portion includes a lower portion main body and a lower portion extension, the first lower depression is formed on the lower portion extension such that a thickness of the lower portion extension is smaller than a thickness of the lower portion main body, where the first lower shielding portion is disposed at the lower portion extension and disposed in the first lower depression.

In an embodiment of the disclosure, the at least one depression includes a second lower depression formed in the lower portion main body.

In an embodiment of the disclosure, the lower portion includes at least one first engagement portion, and the rear plug includes at least one second engagement portion engaged with the at least one first engagement portion.

In an embodiment of the disclosure, the middle portion includes at least one assembly hole, and the lower portion is inserted into at least one assembly of the at least one assembly hole.

In an embodiment of the disclosure, the middle portion includes at least one assembly portion, the upper shielding includes at least one support arm engaged with the at least one assembly portion, and the lower shielding includes at least one second support arm engaged with the at least one assembly portion.

Based on the above, in the connector of the disclosure, the first portion of the second terminal is insert molded on the lower portion, and the second portion is insert molded on the rear plug. The combination of the lower portion with the first portion can be done at the same time as the combination of the rear plug with the second portion, and then the first portion and the second portion are bent, such that the first portion and the second portion are respectively fixed by the lower portion and the rear plug in two different directions. Therefore, the assembly steps for positioning these second terminals can be simplified, such that the assembly yield and assembly efficiency can be effectively improved.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
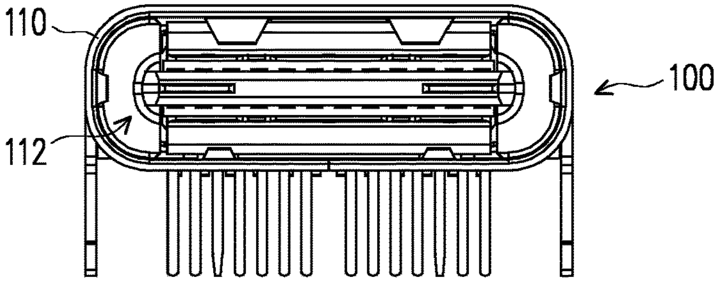
FIG. 1 is a schematic diagram of a connector according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Figure 2:
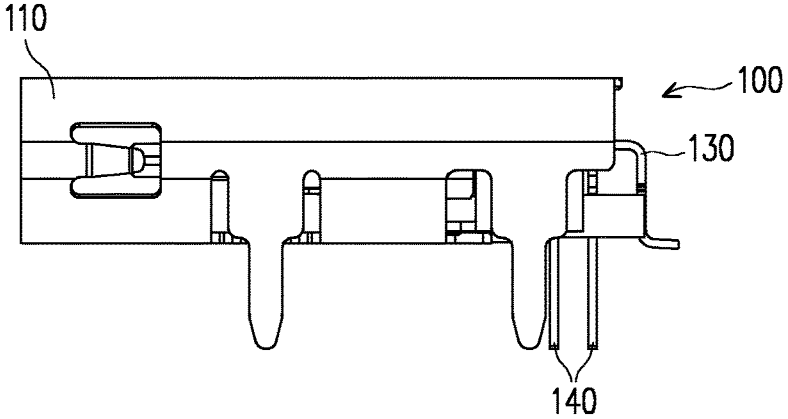
FIGS. 2 to 4 are schematic diagrams of a connector from other perspectives.
Figure 3:
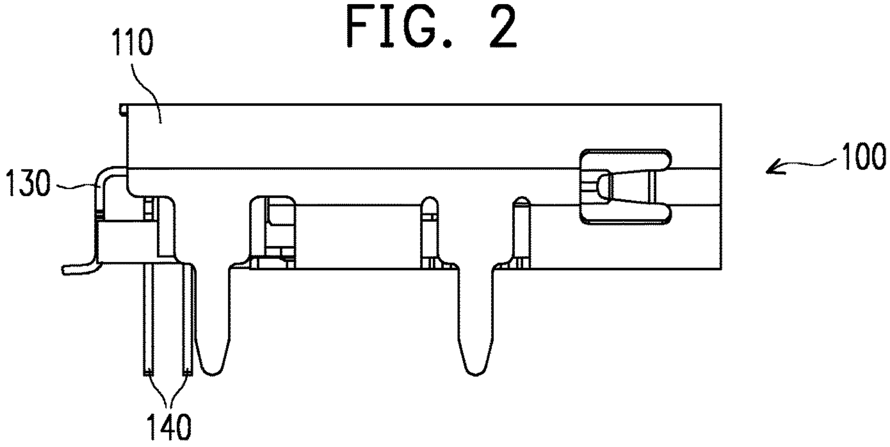
Figure 4:
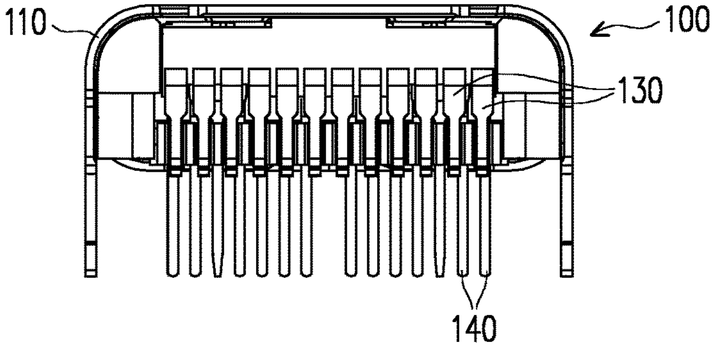

FIG. 1 is a schematic diagram of a connector according to an embodiment of the disclosure. FIGS. 2 to 4 are schematic diagrams of a connector from other perspectives. In detail, FIG. 1 is a schematic front diagram of a connector 100 of the present embodiment, and FIGS. 2 and 3 are respectively schematic diagrams of right and left sides of the connector 100 of the present embodiment. FIG. 4 is a schematic diagram of a back of a connector 100 of the present embodiment. In the present embodiment, a USB type-C female connector is taken as an example for the connector 100, but the type of the connector 100 of the disclosure is not limited thereto.

In the present embodiment, a casing 110 has an opening 112 (FIG. 1), and a docking connector (not shown) is configured to be inserted into the casing 110 from the opening 112 so as to contact first terminals 130 and second terminals 140 in the casing 110. Further, the first terminals 130 and the second terminals 140 extend outside of the casing 110 at a side away from the opening 112 so as to contact a circuit board (not shown). In the present embodiment, the number of the first terminals 130 and the second terminals 140 is 12, respectively, but the number of the first terminals 130 and the second terminals 140 is not limited thereto.

Figure 5:
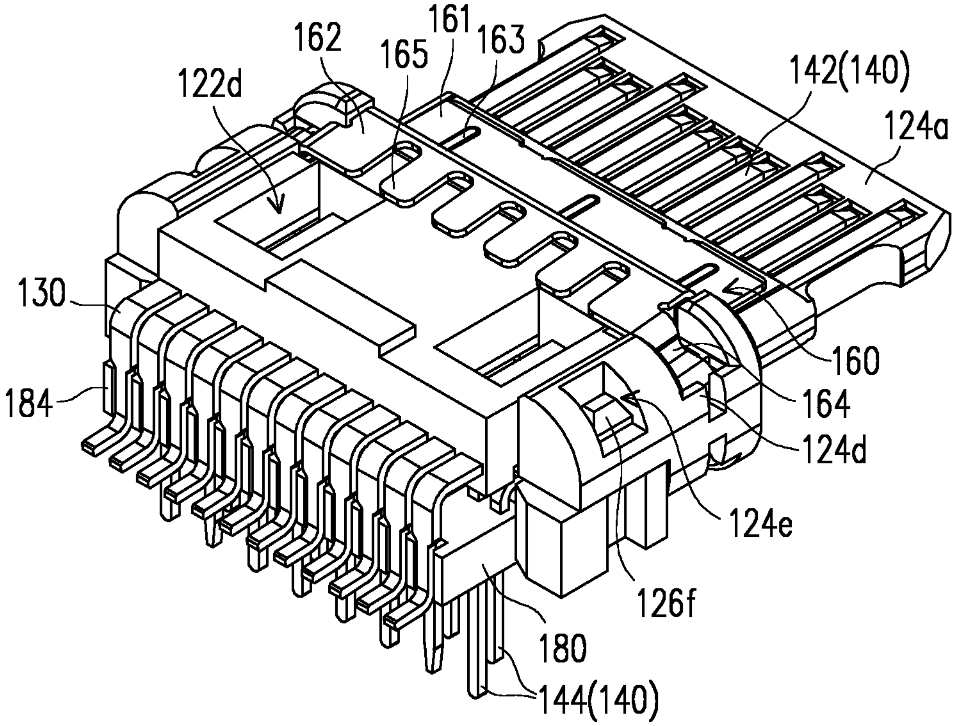
FIG. 5 is a schematic perspective diagram of a connector of FIG. 1 with the casing hidden.
Figure 6:
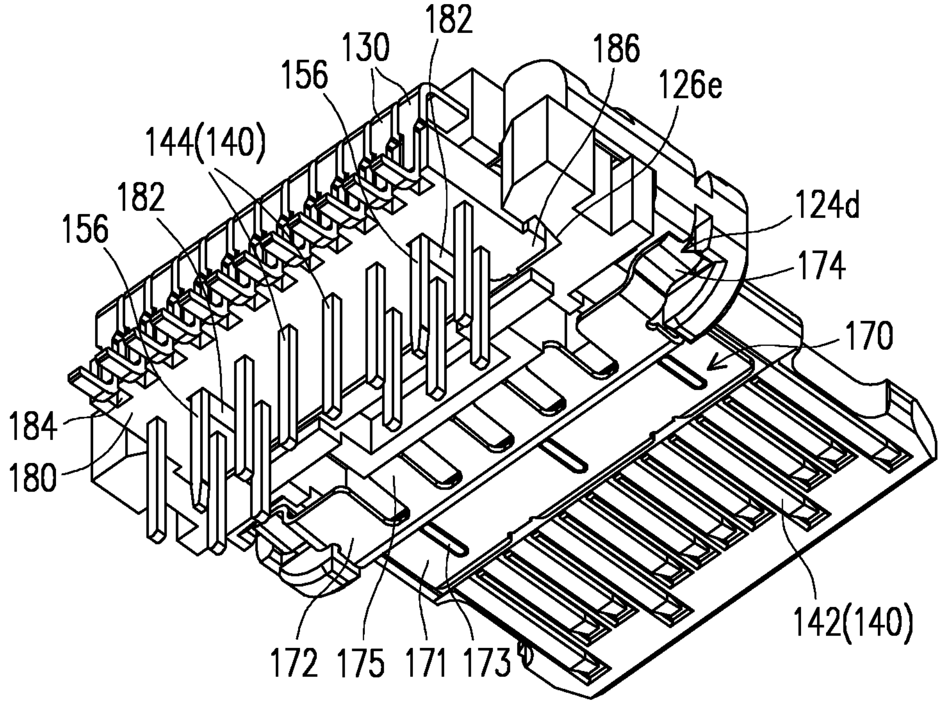
FIG. 6 is a schematic diagram of FIG. 5 from another perspective.
Figure 7:
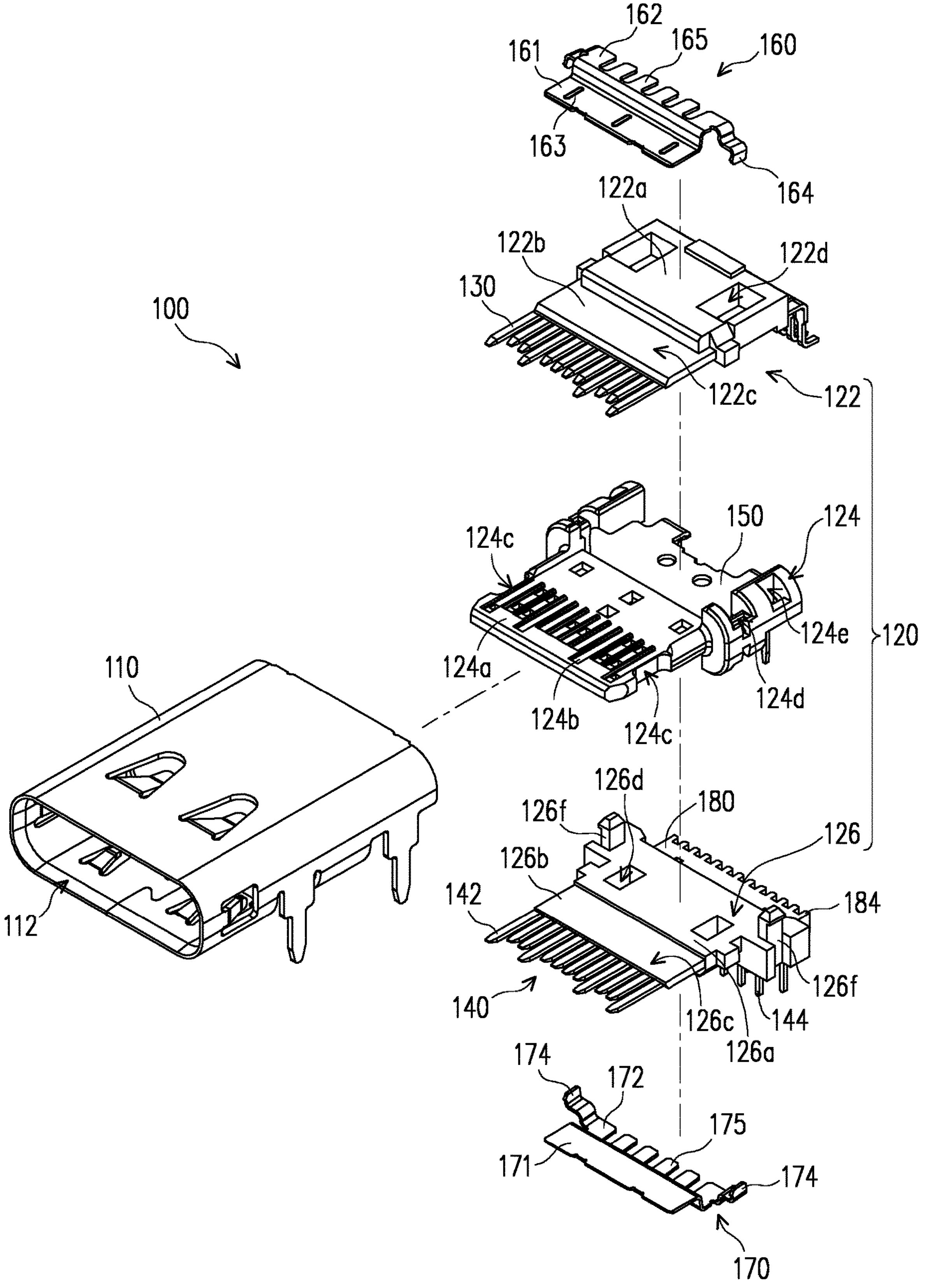
FIG. 7 is an exploded diagram of a connector of FIG. 1.
Figure 8:
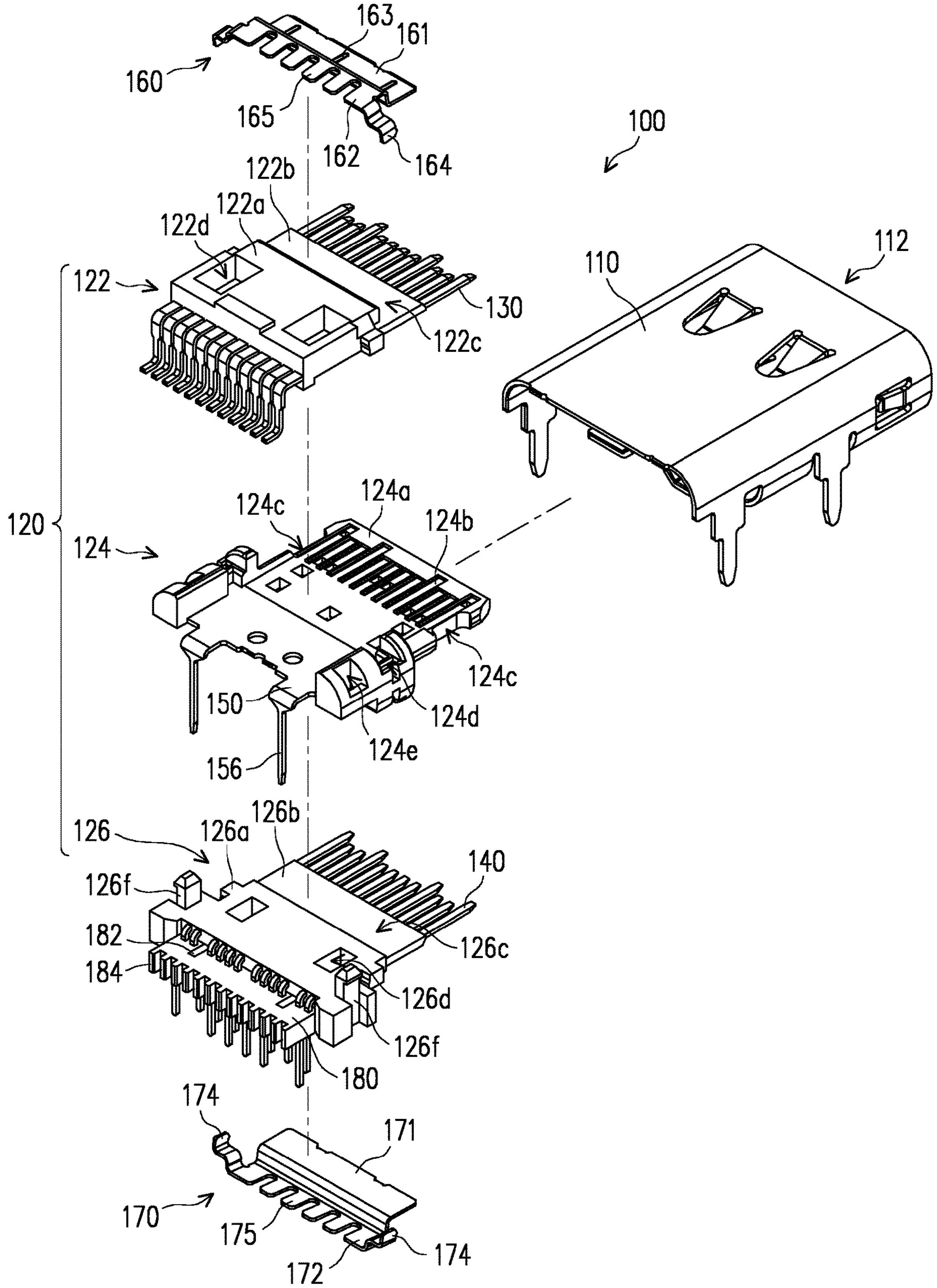
FIG. 8 is a schematic diagram of a connector from another perspective.

FIG. 5 is a schematic perspective diagram of a connector of FIG. 1 with the casing hidden. FIG. 6 is a schematic diagram of FIG. 5 from another perspective. FIG. 7 is an exploded diagram of a connector of FIG. 1. FIG. 8 is a schematic diagram of a connector from another perspective. Referring to FIGS. 5 to 8, the connector 100 of the present embodiment includes the casing 110, a base 120, a rear plug 180, the multiple first terminals 130, the multiple second terminals 140, a middle shielding 150, an upper shielding 160, and a lower shielding 170.

As shown in FIGS. 7 and 8, the base 120 is disposed in the casing 110 and includes an upper portion 122, a middle portion 124, and a lower portion 126 that are sequentially connected. In the present embodiment, material of the upper portion 122, the middle portion 124, and the lower portion 126 is an insulating material, such as resin or polymer material, but the material of the upper portion 122, the middle portion 124, and the lower portion 126 is not limited thereto, as long as it can be insulated.

In the present embodiment, partial areas of the first terminals 130 are insert molded on the upper portion 122. In detail, the first terminals 130 are insert molded on the upper portion 122 only through middle areas, and opposite ends of the first terminals 130 are exposed outside of the upper portion 122.

As shown in FIGS. 7 and 8, the upper portion 122 has a surface away from the middle portion 124, and the surface has at least one depression, such that the upper portion 122 has different thicknesses. With the aforementioned depression, the electrical characteristics of the connector 100 may be adjusted, such that the connector 100 can better meet the impedance matching requirements.

Specifically, in the present embodiment, the upper portion 122 includes an upper portion main body **122*a* and an upper portion extension 122*b*. In the present embodiment, the upper portion 122 includes a first upper depression 122*c* formed in the upper portion extension 122*b*, such that a thickness of the upper portion extension 122*b* is smaller than a thickness of the upper portion main body 122*a***.

In the present embodiment, the upper portion main body **122*a* wraps the first terminals 130 at a side away from the opening 112, and the upper portion extension 122*b* wraps the first terminals 130 at a side close to the opening 112. With the upper portion extension 122*b*, the fixing and covering of the first terminals 130 can be improved, such that the first terminals 130 can be correctly fixed at predetermined positions and separate the first terminals 130** and other components, so as to avoid short circuit.

As shown in FIGS. 7 and 8, the upper portion 122 further includes a second upper depression **122*d*. The second upper depression 122*d* is formed in a partial area of the upper portion main body 122*a*, such that the upper portion main body 122*a* has different thicknesses in different areas. In the present embodiment, the second upper depression 122*d* penetrates the upper portion 122 to expose part of the first terminals 130, and the second upper depression 122*d* is disposed at specific terminals (especially terminals or terminal pairs for signal transmission) of the first terminals 130, so as to change electrical characteristics, such that the connector 100** can better meet the requirements such as impedance matching.

As shown in FIG. 7 and FIG. 8, in the present embodiment, each of the second terminals 140 includes a first portion 142 and a second portion 144 that are connected in a bent manner. In the present embodiment, these second portions 144 are arranged in two rows. For example, when the number of the second terminals 140 is 12, there are 6 second terminals 140 in each row. However, the disclosure is not limited thereto. In other embodiments, the second portions 144 may also be disposed in the same row.

In the present embodiment, the first portions 142 are insert molded on the lower portion 126, the second portions 144 are insert molded on the rear plug 180, and opposite terminals of the first portion 142 and opposite terminals of the second portion 144 are exposed outside of the lower portion 126 and the rear plug 180.

During the manufacturing process, the first portions 142 and the second portions 144 may be insert molded on the lower portion 126 and the rear plug 180 at the same time, and then the first portions 142 and the second portions 144 may be bent, such that the first portions 142 and the second portions 144 are fixed by the lower portion 126 and the rear plug 180 in two different directions, respectively.

In other words, the combination of the lower portion 126 with the first portions 142 can be done at the same time as the combination of the rear plug 180 with the second portions 144. Thereby, the manufacturing process can be simplified, and the assembly efficiency can be effectively improved.

Moreover, as shown in FIG. 6, in the present embodiment, the lower portion 126 includes at least one first engagement portion 126*e*, and the rear plug 180 includes at least one second engagement portion 186 engaged with the at least one first engagement portion 126*e*. The lower portion 126 and the rear plug 180 may be engaged with the second engagement portion 186 through the first engagement portion 126*e* after the first portion 142 and the second portion 144 are bent. In the present embodiment, in an arrangement direction of the second terminals 140, a length of the lower portion 126 is greater than a length of the rear plug 180, and the lower portion 126 is engaged with the rear plug 180 around the rear plug 180 from two sides thereof.

With the special design, the first portion 142 and the second portion 144 are insert molded on the lower portion 126 and the rear plug 180 at the same time, and relative positions of the lower portion 126 and the rear plug 180 are fixed by the first engagement portion 126*e* and the second engagement portion 186. Thereby, relative positions between the second terminals 140 can be quickly and effectively fixed, the manufacturing process can be simplified, and the assembly yield and assembly efficiency can be effectively improved.

In the present embodiment, the lower portion 126 has a structure corresponding to the upper portion 124. As shown in FIGS. 7 and 8, in the present embodiment, the lower portion 126 has a surface away from the middle portion 124, and the surface has at least one depression, such that the lower portion 126 has different thicknesses. With the aforementioned depression, the electrical characteristics of the connector 100 may be adjusted, such that the connector 100 can better meet the impedance matching requirements.

Specifically, in the present embodiment, the lower portion 126 includes a lower portion main body 126*a* and a lower portion extension 126*b*. In the present embodiment, the lower portion 126 includes a first lower depression 126*c* formed in the lower portion extension 126*b*, such that a thickness of the lower portion extension 126*b* is smaller than a thickness of the lower portion main body 126*a*.

In the present embodiment, the lower portion main body 126*a* wraps the second terminals 140 at a side away from the opening 112, and the lower portion extension 126*b* wraps the second terminals 140 at a side close to the opening 112. With the lower portion extension 126*b*, the fixing and covering of the second terminals 140 can be improved, such that the second terminals 140 can be correctly fixed at predetermined positions and separate the second terminals 140 and other components, so as to avoid short circuit.

As shown in FIGS. 7 and 8, the lower portion 126 further includes a second lower depression 126*d*. The second lower depression 126*d* is formed in a partial area of the lower portion main body 126*a*, such that the lower portion main body 126*a* has different thicknesses in different areas. In the present embodiment, the second lower depression 126*d* penetrates the lower portion 126 to expose part of the second terminals 140, and the second lower depression 126*d* is disposed at specific terminals (especially terminals or terminal pairs for signal transmission) of the second terminals 140, so as to change electrical characteristics, such that the connector 100 can better meet the requirements such as impedance matching.

As shown in FIG. 8, in the present embodiment, the middle portion 124 includes at least one assembly hole 124*e*, and the lower portion 126 includes at least one assembly 126*f* inserted into the at least one assembly hole 124*e*. In the present embodiment, the number of the assembly hole 124*e* is two, for example, and the number of the assembly 126*f* is two, for example, which are respectively disposed on two sides of the middle portion 124 and two sides of the lower portion 126. As shown in FIG. 5, in the present embodiment, the middle portion 124 and the lower portion 126 can be fixed by the assembly hole 124*e* and the assembly 126*f*, but in other embodiments, the upper portion 122, the middle portion 124, and the lower portion 126 may also be integrated, or be fixed by other means such as bonding.

Figure 9:
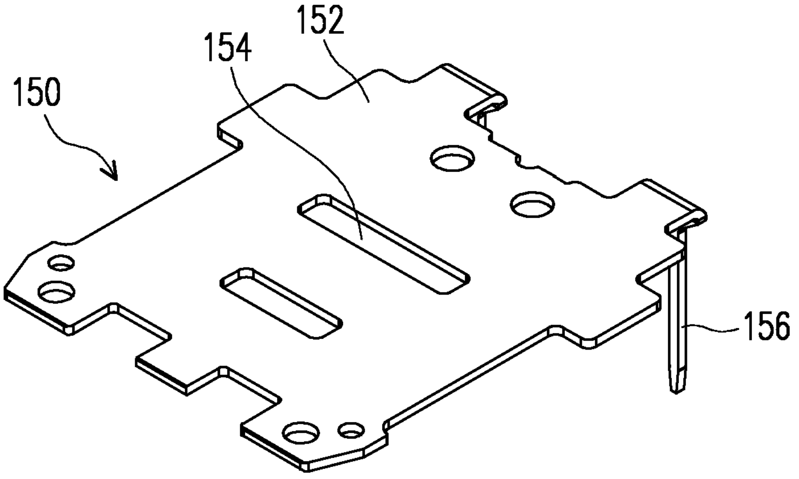
FIG. 9 is a schematic diagram of a middle shielding of a connector of FIG. 1.

FIG. 9 is a schematic diagram of a middle shielding of a connector of FIG. 1.

Figure 10:
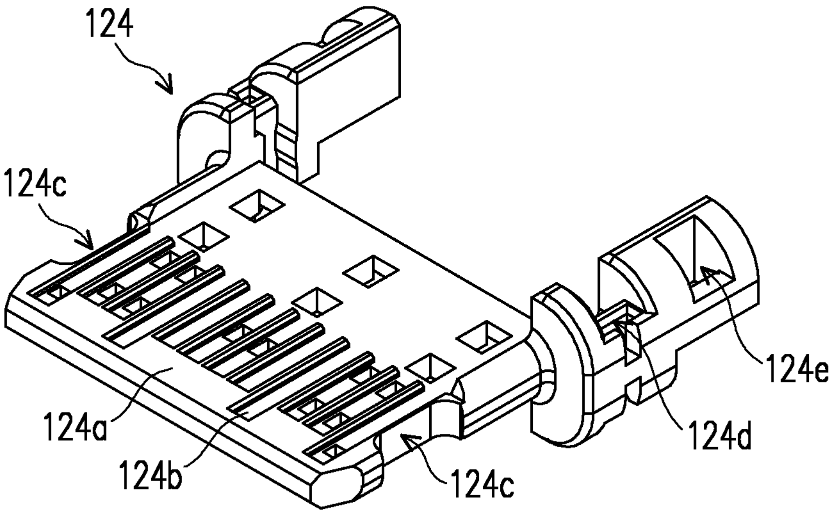
FIG. 10 is a schematic diagram of a middle portion of a connector of FIG. 1.

FIG. 10 is a schematic diagram of a middle portion of a connector of FIG. 1. Referring to FIGS. 7 to 10, the middle shielding 150 penetrates the middle portion 124 by way of insert molding, for example, and is disposed between the first terminals 130 and the second terminals 140. Therefore, the middle shielding 150 can separate the first terminals 130 and the second terminals 140 so as to avoid signal interference between the first terminals 130 and the second terminals 140.

In the present embodiment, the middle portion 124 includes a tongue portion 124*a*. Opposite surfaces of the tongue portion 124*a* have multiple grooves 124*b*. The opposite surfaces of the tongue portion 124*a* have 12 grooves 124*b*, respectively. The twelve first terminals 130 and the twelve second terminals 140 extend into the grooves 124*b* on upper and lower surfaces of the tongue portion 124*a* at positions close to the opening 112 of the casing 110 (FIGS. 5 and 6), and fix relative position between the first terminals 130 and the second terminals 140.

As shown in FIGS. 7 and 8, in the present embodiment, part of the middle shielding 150 is exposed outside of a front edge and a side edge of the middle portion 124. In detail, the middle portion 124 has a depression 124*c* on each of the two side edges, and part of the middle shielding 150 is exposed outside of the depression 124*c*. Moreover, part of the middle shielding 150 is also be exposed outside of the middle portion 124 in a front edge near two sides. When the connector 100 is docked with the docking connector, the middle shielding 150 can contact and be conducted with the docking connector at a part exposed outside of the depression 124*c* at a side edge of the middle portion 124 and at two sides exposed outside of a front edge of the middle portion 124.

In the present embodiment, in order to maintain the structural strength of the middle portion 124, the middle shielding 150 is not exposed outside of an entire front edge of the middle portion 124. However, in other embodiments, if the structural strength of the middle portion 124 can be reinforced by other means, the middle shielding 150 may also be exposed outside of the entire front edge of the middle portion 124. Of course, the area where the middle shielding 150 is exposed outside of the middle portion 124 is not limited thereto.

As shown in FIG. 9, in the present embodiment, in order to allow the middle shielding 150 to be firmly fixed to the middle portion 124, the middle shielding 150 includes a plate body 152 and multiple perforations 154 penetrating the plate body 152; during insert molding process, part of the middle portion 124 may extend into the perforations 154 to increase the adhesion between the two.

Further, the middle shielding 150 includes at least one ground terminal 156 perpendicular to the plate body 152. The number of the ground terminal 156 is, for example, two, but the disclosure is not limited thereto. As shown in FIG. 6, the ground terminals 156 and parts of the second portions 144 away from the opening 112 are disposed in a same row. In other embodiments, the ground terminals 156 may also not need to be in the same row as the second terminals 140.

As shown in FIG. 5 and FIG. 8, in the present embodiment, the rear plug 180 includes at least one slot 182 penetrating therethrough. The number of the slot 182 is, for example, two, but the disclosure is not limited thereto. The ground terminals 156 pass through the slots 182, and the slots 182 define positions of the ground terminals 156. Moreover, the slots 182 are staggered from the second portions 144, and the rear plug 180 tightly covers the second portions 144. As shown in FIGS. 5 to 8, the rear plug 180 further includes multiple recesses 184 that are recessed inwardly at a side away from the opening 112, and the recesses 184 correspond to the first terminals 130, respectively.

Referring to FIGS. 5 to 8, the upper shielding 160 is disposed at one side of the upper portion 122, and the lower shielding 170 is disposed at one side of the lower portion 126. The connector 100 of the present embodiment not only resists electromagnetic interference, through the casing 110 made of metal, but also enhances anti-electromagnetic interference effect by configuring the upper shielding 160 and the lower shielding 170.

In the present embodiment, the middle portion 124 includes at least one assembly portion **124*d*, and the upper shielding 160 and the lower shielding 170 respectively includes at least one first support arm 164 and at least one second support arm 174 that are engaged with the at least one assembly portion 124*d*. The assembly hole 124*e*, the first support arm 164, and the second support arm 174 of the present embodiment are respectively disposed on two sides of the middle portion 124, two sides of the upper shielding 160, and two sides of the lower shielding 170. The upper shielding 160 and the lower shielding 170 may be fixed to the middle portion 124 through means of assembly. In other embodiments, the assembly portion 124*d* may also be disposed at the upper portion 122 and the lower portion 126**.

In the present embodiment, the upper shielding 160 includes a first upper shielding portion 161 and a second upper shielding portion 162 that is connected to the first upper shielding portion 161 in a bent manner. The first upper shielding portion 161 is disposed in the upper portion extension **122*b* and disposed in the first upper depression 122*c*, and the second upper shielding portion 162 is disposed in the upper portion main body 122*a***.

In the present embodiment, the first upper shielding portion 161 of the upper shielding 160 includes multiple upper bulges 163. When the connector 100 is docked with the docking connector, the docking connector can be in contact with the upper bulge 163 such that the plugging/unplugging force between the two is increased. The second upper shielding portion 162 of the upper shielding 160 includes multiple upper cantilevers 165. The upper cantilevers 165 are slightly tilted toward the casing 110. When the casing 110 is sleeved outside the above-mentioned components, the upper cantilevers 165 of the upper shielding 160 can contact and be conducted with the casing 110.

In the present embodiment, the lower shielding 170 has a structure corresponding to the upper shielding 160. The lower shielding 170 includes a first lower shielding portion 171 and a second lower shielding portion 172 that is connected to the first lower shielding portion 171 in a bent manner. The first lower shielding portion 171 is disposed in the lower portion extension **126*b* and disposed in the first lower depression 126*c*, and the second lower shielding portion 172 is disposed in the lower portion main body 126*a***.

The first lower shielding portion 171 of the lower shielding 170 includes multiple lower bulges 173. When the connector 100 is docked with the docking connector, the docking connector may be in contact with the lower bulge 173 such that the plugging/unplugging force between the two is increased. The second lower shielding portion 172 of the lower shielding 170 includes multiple lower cantilevers 175. The lower cantilevers 175 are slightly tilted toward the casing 110. When the casing 110 is sleeved outside the above-mentioned components, the lower cantilevers 175 of the lower shielding 170 can contact and be conducted with the casing 110.

In summary, in the connector of the disclosure, the first portions of the second terminals are insert molded on the lower portion, and the second portions of the second terminals are insert molded on the rear plug. The combination of the lower portion with the first portion can be done at the same time as the combination of the rear plug with the second portion, and then the first portions and the second portions are bent, such that the first portions and the second portions are respectively fixed by the lower portion and the rear plug in two different directions. Therefore, the assembly steps for positioning the second terminals can be simplified, such that the assembly yield and assembly efficiency can be effectively improved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A connector, comprising:

a casing;

a base, disposed in the casing and comprises an upper portion, a middle portion and, a lower portion;

a rear plug, disposed at a side of the lower portion;

a plurality of first terminals, insert molded on the upper portion;

a plurality of second terminals, each of the second terminals comprising a first portion and a second portion that are connected in a bent manner, wherein the first portions are insert molded on the lower portion, and the second portions are insert molded on the rear plug;

a middle shielding, passing through the middle portion and disposed between the first terminals and the second terminals;

an upper shielding, fixed to the base and disposed at a side of the upper portion; and a lower shielding, fixed to the base and disposed at a side of the lower portion, wherein the lower portion comprises at least one first engagement portion, and the rear plug comprises at least one second engagement portion detachably engaged with the at least one first engagement portion, the lower portion and the rear plug are two members independent from each other.

2. The connector as described in claim 1, wherein the upper portion has a surface away from the middle portion, and the surface has at least one depression, such that the upper portion has different thicknesses.

3. The connector as described in claim 2, wherein the upper shielding comprises a first upper shielding portion and a second upper shielding portion connected to the first upper shielding portion in a bent manner, wherein when the connector is docked with a docking connector, the first upper shielding portion contacts the docking connector, the second upper shielding portion abuts the casing, the at least one depression comprises a first upper depression, the upper portion comprises an upper portion main body and an upper portion extension, the first upper depression is formed on the upper portion extension such that a thickness of the upper portion extension is smaller than a thickness of the upper portion main body, wherein the first upper shielding portion is disposed at the upper portion extension and disposed in the first upper depression.

4. The connector as described in claim 3, wherein the at least one depression comprises a second upper depression formed in the upper portion main body.

5. The connector as described in claim 1, wherein the lower portion has a surface away from the middle portion, and the surface has at least one depression, such that the lower portion has different thicknesses.

6. The connector as described in claim 5, wherein the lower shielding comprises a first lower shielding portion and a second lower shielding portion connected to the first lower shielding portion in a bent manner, wherein when the connector is docked with a docking connector, the first lower shielding portion contacts the docking connector, the second lower shielding portion abuts the casing, the at least one depression comprises a first lower depression, the lower portion comprises a lower portion main body and a lower portion extension, the first lower depression is formed on the lower portion extension such that a thickness of the lower portion extension is smaller than a thickness of the lower portion main body, wherein the first lower shielding portion is disposed at the lower portion extension and located in the first lower depression.

7. The connector as described in claim 6, wherein the at least one depression comprises a second lower depression formed in the lower portion main body.

8. The connector as described in claim 1, wherein the middle portion comprises at least one assembly hole, and the lower portion is inserted into at least one assembly of the at least one assembly hole.

9. The connector as described in claim 1, wherein the middle portion comprises at least one assembly portion, the upper shielding comprises at least one support arm engaged with the at least one assembly portion, and the lower shielding comprises at least one second support arm engaged with the at least one assembly portion.

* * * * *